US012665215B2

(12) United States Patent
Lim et al.

(10) Patent No.: US 12,665,215 B2
(45) Date of Patent: Jun. 23, 2026

(54) TRANSFER DEVICE FOR UNIT CELL

(71) Applicant: LG Energy Solution, Ltd., Seoul (KR)

(72) Inventors: Eun Kyeong Lim, Daejeon (KR); Jae Woong Yoo, Daejeon (KR); Shin Hwa Lee, Daejeon (KR); Jeong Min Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 618 days.

(21) Appl. No.: 18/031,792

(22) PCT Filed: Feb. 21, 2022

(86) PCT No.: PCT/KR2022/002535
§ 371 (c)(1),
(2) Date: Apr. 13, 2023

(87) PCT Pub. No.: WO2022/182085
PCT Pub. Date: Sep. 1, 2022

(65) Prior Publication Data
US 2023/0307689 A1 Sep. 28, 2023

(30) Foreign Application Priority Data
Feb. 23, 2021 (KR) ........................ 10-2021-0024397

(51) Int. Cl.
H01M 10/04 (2006.01)
(52) U.S. Cl.
CPC ............................... H01M 10/0409 (2013.01)
(58) Field of Classification Search
CPC ............. H01M 10/0409; H01M 10/04; H01M 10/0404; H01M 10/0413; H01M 10/0463;
(Continued)

(56) References Cited

U.S. PATENT DOCUMENTS 10,703,574 B2 * 7/2020 Tanaka .................. F26B 25/003
2018/0254468 A1 * 9/2018 Kim .................... H01M 10/058
(Continued)

FOREIGN PATENT DOCUMENTS

CN 110085931 A 8/2019
CN 110506345 A 11/2019
(Continued)

OTHER PUBLICATIONS

Extended European Search Report for Application No. 22760003.8 dated Mar. 4, 2024, 7 pages.
(Continued)

*Primary Examiner* — Gene O Crawford
*Assistant Examiner* — Abby A Jorgensen
(74) *Attorney, Agent, or Firm* — Lerner David LLP

(57) ABSTRACT

A transfer device for a unit cell, which transfers a unit cell, in which electrodes and separators are stacked by a predetermined number, includes: a conveyor configured to travel in one direction and transfer the seated unit cell when the unit cell is seated; a first rail disposed at one side of the conveyor in parallel to the conveyor; and a second rail disposed at the other side of the conveyor in parallel to the conveyor, wherein a protrusion protrudes from a surface of each of the first rail and the second rail along the traveling direction of the unit cell, and the unit cell is supported by the protrusion and transferred while being transferred through the conveyor.

11 Claims, 4 Drawing Sheets

(58) Field of Classification Search
CPC ...... B65H 5/021; B65H 2801/72; B65H 5/38;
B65H 2701/19; Y02E 60/10; Y02P 70/50
See application file for complete search history.

(56) References Cited

U.S. PATENT DOCUMENTS

| | | | | |
|---|---|---|---|---|
| 2020/0144589 | A1* | 5/2020 | Abe | ................... B65H 31/3063 |
| 2020/0153026 | A1* | 5/2020 | Abe | ....................... B23K 20/26 |
| 2020/0287182 | A1 | 9/2020 | Kong et al. | |
| 2020/0354166 | A1* | 11/2020 | Abe | ........................ B65H 5/14 |

FOREIGN PATENT DOCUMENTS

| | | | | | |
|---|---|---|---|---|---|
| CN | 110337413 | B | * | 1/2021 | .............. B23Q 7/00 |
| CN | 112186212 | A | | 1/2021 | |
| GB | 912498 | A | * | 12/1962 | ......... B65G 21/2072 |
| JP | H09286551 | A | | 11/1997 | |
| JP | 2016219329 | A | | 12/2016 | |
| JP | 2019021484 | A | | 2/2019 | |
| KR | 20100113780 | A | * | 10/2010 | ........ H05K 13/0061 |
| KR | 101241928 | B1 | | 3/2013 | |
| KR | 101692902 | B1 | | 1/2017 | |
| KR | 101738724 | B1 | * | 5/2017 | ........ H01M 10/0404 |
| KR | 20180082135 | A | | 7/2018 | |
| KR | 20190092018 | A | * | 8/2019 | ............. B65G 13/00 |
| KR | 20200117508 | A | | 10/2020 | |
| KR | 20210011759 | A | | 2/2021 | |
| WO | WO-2018055763 | A1 | * | 3/2018 | ............. B65G 25/08 |
| WO | WO-2020106030 | A1 | * | 5/2020 | ............. B32B 38/12 |

OTHER PUBLICATIONS

International Search Report for Application No. PCT/KR2022/002535 mailed May 30, 2022, 2 pages.

* cited by examiner

VERTICAL
DIRECTION

WIDTH
DIRECTION

TRAVELING
DIRECTION

TRAVELING
DIRECTION

WIDTH
DIRECTION

TRAVELING
DIRECTION

40

42

41

43    42    42a 4    4a 41    41a

TRAVELING
DIRECTION

TRANSFER DEVICE FOR UNIT CELL

CROSS-REFERENCE TO RELATED APPLICATIONS

The present application is a national phase entry under 35 U.S.C. § 371 of the International Application No. PCT/KR2022/002535 filed on Feb. 21, 2022, which claims priority from Korean Patent Application No. 10-2021-0024397, filed on Feb. 23, 2021, the disclosures of which are incorporated herein by reference in their entireties.

FIELD OF THE INVENTION

The present invention relates to a transfer device for a unit cell, which transfers unit cells, in which electrode (negative electrode and positive electrode) and separators are stacked in a predetermined number and order, and more particularly, to a transfer device for a unit cell, in which the unit cell is capable of being minimized in wear and damage due to frictional force generated at a contact portion with a rail during the transferring.

BACKGROUND OF THE INVENTION

The demands for high-efficiency secondary batteries are rapidly increasing in the mobile device and electric vehicle fields. Among such the secondary batteries, a lithium secondary battery having high energy density, maintaining a relatively high voltage, and having a low self-discharge rate is commercially widely used, and research and development for improving performance is actively being conducted.

The secondary battery has a structure in which an electrode assembly and an electrolyte are embedded in a case such as a can or a pouch. The electrode assembly has a structure in which positive electrodes, separators, and negative electrodes are repeatedly stacked. In general, the electrode assembly may be classified into a winding type electrode assembly in which positive electrodes, separators, and negative electrodes, which are in the stacked state, are rolled to be embedded in a case and a stack type electrode assembly in which positive electrodes, separators, and negative electrodes, each of which is cut to a predetermined size, are stacked.

Since the winding type electrode assembly has a spirally wound structure, the winding type electrode assembly is suitable for being mounted on a cylindrical battery, but is disadvantageous in space utilization for a prismatic or pouch type battery. On the other hand, since the stack type electrode assembly is adjusted in size when the electrode and the separator are cut, the prismatic shape fitted with the case is easily obtained, but a manufacturing process is relatively complicated, and the stack type electrode assembly is relatively vulnerable to an external impact.

In addition, after a bicell (having a stacked structure of positive electrode/separator/negative electrode, wherein electrodes disposed at the uppermost end and the lowermost end are the same) and/or a half-cell (having a stacked structure of positive electrode/separator/negative electrode, wherein electrodes disposed at the uppermost end and the lowermost end are different from each other) are manufactured into unit cells, each of which has an appropriate size, so that advantages of the winding type electrode assembly and advantages of the stack type electrode assembly are combined with each other, a stack & folding process of manufacturing an electrode assembly by folding a folding separator after the unit cells are arranged at intervals on the folding separator has been developed.

In the stack & folding process, after pre-manufacturing a unit cell having a pre-planned structure, the unit cells are transferred one by one from a starting position, at which the unit cells are stored, to a target position, and then, the unit cells are placed on the folding separator so as to be put into a manufacturing device for folding the folding separator.

Here, the unit cells are transferred through a transfer device. Referring to FIGS. 1a and 1b that schematically illustrates a transfer device for a unit cell according to the related art, when a unit cell 4 seated on a transfer device 1 is transferred up to a target position, the unit cell is gripped by a gripper 5 having a clamp structure and then additionally moves by the gripper 5 and is put into a roller 6 provided at an inlet of the manufacturing device.

Here, the transfer device 1 comprises a conveyor 2, which travels to one side to transfer the seated unit cell 4 when the unit cell 4 is seated, and first and second rails 3a and 3b respectively disposed at one side and the other side of the conveyor 2.

The conveyor 2 has a structure in which a belt is coupled to wind a plurality of rollers, which are similar to a caterpillar track, at once, and the belt is configured to continuously rotate while the rollers rotate. Thus, when the unit cell 4 is seated on the belt, the unit cell 4 moves by the belt. Here, a middle portion of the unit cell 4 is seated on the belt, and both sides facing each other with the middle portion therebetween are transferred while being mounted on the first rail 3a and the second rail 3b.

In the structure according to the related art, since each of the first rail 3a and the second rail 3b is made of a metal material and has a plate shape, the unit cell 4 has a problem that friction occurs at the contact portion of the first rail 3a and the second rail 3b during the transferring. The friction may wear a surface of the unit cell, and the unit cell may be damaged by the wear.

Particularly, in the unit cell 4, the separator is often disposed on the surface of the conveyor, on which the unit cell 4 is seated. Thus, when the separator is manufactured as thin as possible so as to increase in capacity, as a length of the transfer device 1 becomes longer, the wear of the separator occurs by the friction to cause various problems (occurrence of short circuit, deterioration of yield, and the like).

BRIEF SUMMARY OF THE INVENTION

Accordingly, a main object of the present invention is to provide a transfer device for a unit cell, in which a contact area between rails (first rail and second rail) and a unit cell is minimized to reduce frictional force generated therebetween, thereby solving the problem caused by friction that may occur during transferring of the unit cell.

The present invention for achieving the above-described object provides a transfer device for a unit cell, which transfers a unit cell, in which electrodes and separators are stacked by a predetermined number, comprising: a conveyor configured to travel in one direction and transfer the seated unit cell when the unit cell is seated; a first rail disposed at one side of the conveyor in parallel to the conveyor; and a second rail disposed at the other side of the conveyor in parallel to the conveyor, wherein a protrusion protrudes from a surface of each of the first rail and the second rail along the traveling direction of the unit cell, and the unit cell is supported by the protrusion and transferred while being transferred through the conveyor.

The protrusion may protrude to continuous along a longitudinal direction of the first rail and the second rail.

At least two or more protrusions may be disposed to be spaced apart from and parallel to each other on each of the first rail and the second rail.

The first rail and the second rail may be movable away from or close to the conveyor along a width direction perpendicular to the traveling direction of the unit cell.

Each of the first rail and the second rail may be movable to ascend or descend along a vertical direction.

The second rail may have a length less than that of the first rail and, and when the unit cell is transferred, a tab guide through which the electrode tab protruding from each of the electrodes passes to prevent sagging of the electrode tab may be disposed to continue along the traveling direction of the unit cell.

In the tab guide, a lower arm disposed below the electrode tab and an upper arm disposed above the electrode tab may be disposed in parallel to each other to form a guide groove, into which the electrode tab enters to restrict vertical separation of the electrode tab while the unit cell is transferred, between the upper arm and the lower arm.

Each of the lower arm and the upper arm may have an inclined surface so that the guide groove increases in size at an end at which the electrode tab starts to enter.

A height of each of the lower arm and the upper arm, which is fixed in a vertical direction, may be adjustable so that a distance and height between the lower arm and the upper arm are adjustable.

In addition, it is preferable that the rail may be made of a synthetic resin to minimize an occurrence of friction. Particularly, it is preferable that the synthetic resin may comprise an acetal resin, and also, the tab guide may also be made of an acetal resin.

According to the present invention having the above configuration, since the protrusion protrudes from each of the first rail and the second rail, and the unit cell is in contact with only the protrusion of each of the first rail and the second rail during the traveling, the wear and damage due to the friction may be maximally suppressed or prevented to reduce the rate of the occurrence of the defects.

At least two or more protrusions may be disposed to be spaced apart from each other on each of the first rail and the second rail, thereby distributing the load.

The first rail and the second rail may be configured to move away from or close to the conveyor along the width direction perpendicular to the traveling direction of the unit cell, and thus, the unit cells having various sizes may be transferred.

Since each of the first rail and the second rail is movable to ascend or descend in the vertical direction, the load of the unit cell, which is applied to the protrusion, may be adjusted.

The second rail has the length less than that of the first rail, and when the unit cell is transferred, the tab guide through which the electrode tab passes to prevent the sagging from occurring may be disposed along the traveling direction of the unit cell to prevent the sagging of the electrode tab from occurring.

The tab guide may guide the electrode tab having the various sizes and shapes because the distance and height between the lower arm and the upper arm are adjusted, and each of the lower arm and the upper arm may have the inclined surface to increase in size of the guide groove at the end at which the electrode tab starts to enter so that the electrode tab is smoothly guided between the lower arm and the upper arm without the impact or bending.

In addition, in the present invention, each of the rail and the tab guide may be made of the acetal resin having the low frictional force to minimize the wear of the unit cell.

DETAILED DESCRIPTION OF THE INVENTION

Figure 1A:
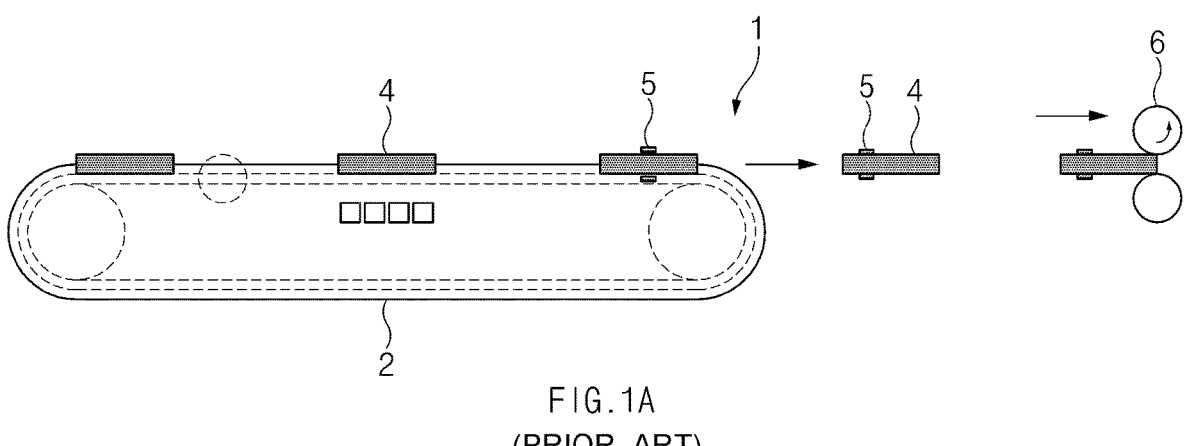
FIG. 1*a* is a schematic side view of a transfer device for a unit cell according to a related art.
Figure 1B:
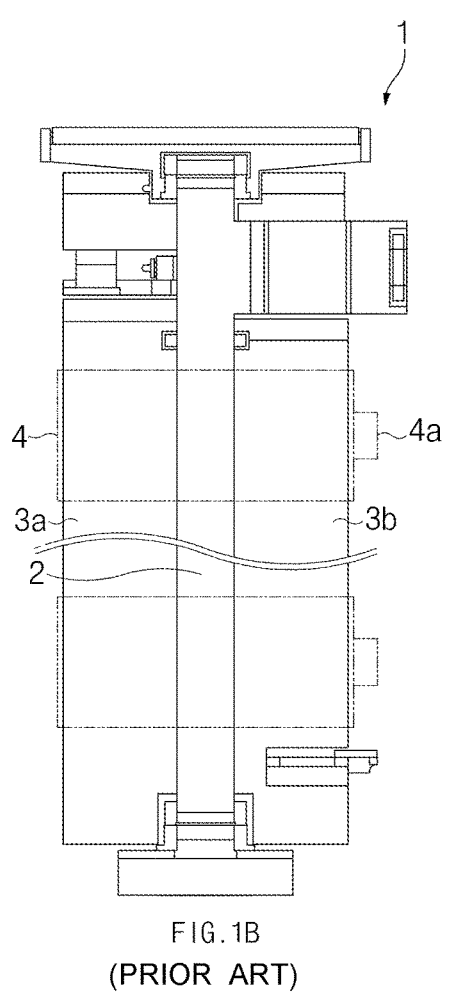
FIG. 1B is a schematic plan view of the transfer device for the unit cell according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a transfer device for a unit cell, which transfers unit cells, in which negative electrodes, separators, and positive electrodes are stacked by the predetermined number, from a starting position, at which the unit cells are seated, to the predetermined specific target position (e.g., the position at which the gripper stands by). Hereinafter, the transfer device for the unit cell according to embodiments of the present invention will be described in more detail with reference to the accompanying drawings.

First Embodiment

Figure 2:
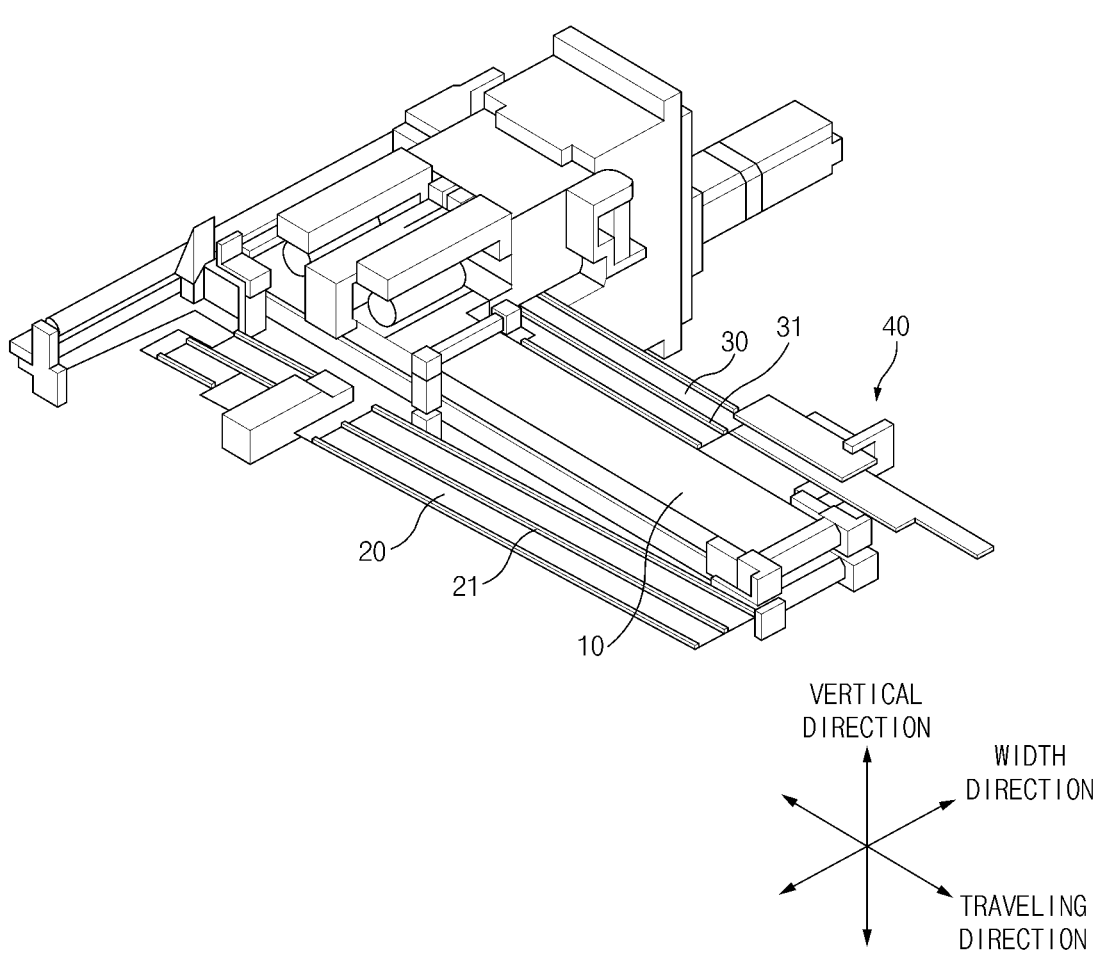
FIG. 2 is a perspective view of a transfer device for a unit cell according to a preferred embodiment of the present invention.
Figure 3:
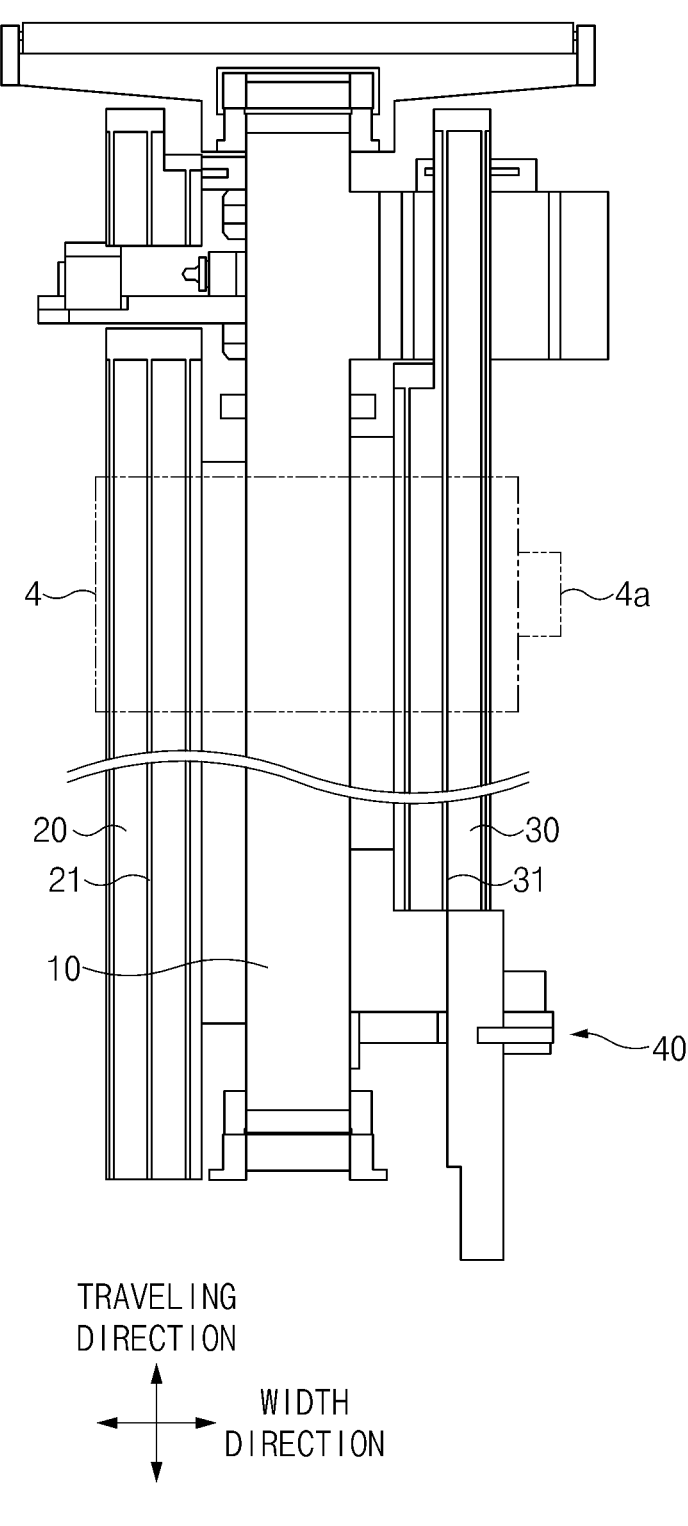
FIG. 3 is a plan view of the transfer device for the unit cell according to the preferred embodiment of the present invention.

FIG. 2 is a perspective view of a transfer device for a unit cell according to a preferred embodiment of the present invention, and FIG. 3 is a plan view of the transfer device for the unit cell according to the preferred embodiment of the present invention.

Referring to FIGS. 2 and 3, the transfer device of the present invention comprises a conveyor 10 and first and second rails 20 and 30, which are disposed at one side and the other side of the conveyor 10, respectively.

The conveyor 10 is configured so that a belt continuously rotates along a longitudinal direction (traveling direction illustrated in FIG. 2) by rotation of rollers (not shown), and when the unit cell 4 is seated on the belt, the seated unit cell 4 is transferred. That is, a length of each of the conveyor 10 and the first and second rails 20 and 30 is determined so that the unit cell 4 is transferred to a target point.

In addition, the first rail 20 is disposed at one side of the conveyor 10 so as to be parallel to the conveyor 10, and the second rail 30 is disposed at the other side of the conveyor 10 with the conveyor 10 therebetween so as to be parallel to the conveyor 10.

In addition, in the present invention, protrusions 21 and 31 protrude from a surface of each of the first rail 20 and the second rail 30 along the traveling direction of the unit cell 4. Here, each of the first rail 20 and the second rail 30 has the same or almost similar length as the conveyor 10, and each of the protrusions 21 and 31 protrudes in all sections in which the unit cell 4 travels on each of the first rail 20 and the second rail 30.

When the unit cell 4 is seated on each of the protrusions 21 and 31, each of the protrusions 21 and 31 protrudes to have a height and size at which a bottom surface of the unit cell 4 is not in contact with a remaining area except for the protrusions.

Thus, while the unit cell 4 is transferred through the conveyor 10, both ends of the unit cell 4 are supported by both the protrusions 21 and 31 and then are transferred. That is, while the unit cell 4 is transferred by the conveyor 10, only the projections 21 and 31 are supported on the first rail 20 and the second rail 30, respectively, and then are transferred.

It is preferable that the protrusions 21 and 31 protrude continuously along the longitudinal direction of the first rail 20 and the second rail 30 (continuously continuous along the traveling direction), but the protrusions 21 and 31 may be discontinuously formed so as not to be continuous at one or more points. Here, the non-continuous section may be determined according to the width of the unit cell. Furthermore, it is preferable that each of ends of the protrusions 21 and 31 is formed in a round shape having an appropriate size so that the unit cell 4 is smoothly transferred without scratches.

In addition, at least two or more protrusions 21 and 31 may be disposed to be spaced apart from and parallel to each other on each of the first rail 20 and the second rail 30. In each of the first rail 20 and the second rail 30, it is preferable that a gap between the protrusions adjacent to each other is maximally spaced apart from each other along the width direction to distribute a load of the unit cell 4.

Furthermore, the first rail 20 and the second rail 30 may be configured to move away from or close to the conveyor 10 along the width direction perpendicular to the traveling direction of the unit cell 4. Thus, when the unit cell 4 is seated as illustrated in FIG. 3, the first rail 20 and the second rail 30 may be adjusted along the width direction according to the size of the unit cell 4.

In addition, each of the first rail 20 and the second rail 30 is movable to ascend or descend in the vertical direction. Thus, since the distribution of the load of the unit cell 4, which is applied to the conveyor 10 and the first and second rails 20 and 30, is adjusted, the load applied to the first rail 20 and the second rail 30 may be reduced to minimize an occurrence of frictional force.

For reference, movement of each of the first rail 20 and the second rail 30 may be accomplished by known methods and combinations thereof, such as a combination of a motor and a link device or a combination of a pneumatic device and a gear device.

Second Embodiment

The present invention provides, as a second embodiment, a transfer device for a unit cell, which additionally comprises a tab guide 40 to prevent sagging of an electrode tab 4a from occurring.

In this embodiment, as illustrated in FIG. 3, a second rail 30 has a length less than that of the first rail 20, and when the unit cell 4 is transferred, a tab guide 40 through which the electrode tab 4a passes to prevent sagging of the electrode tab 4a from occurring is disposed to continue along a traveling direction of the unit cell 4.

Figure 4:
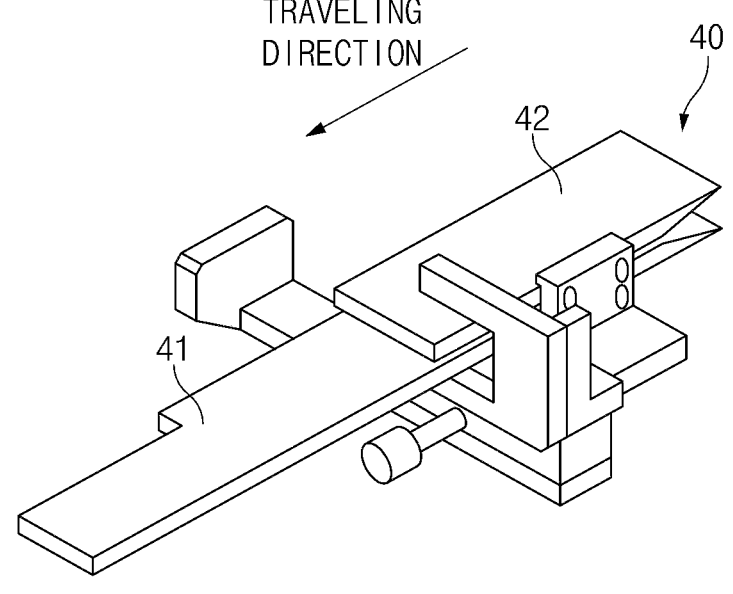
FIG. 4 is a perspective view of a tab guide.
Figure 5:
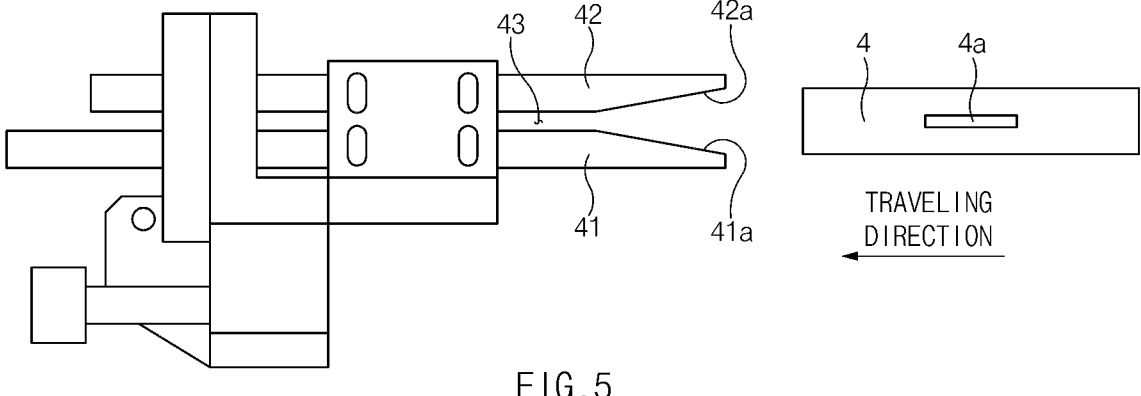
FIG. 5 is a side view of the tab guide.

FIG. 4 is a perspective view of the tab guide 40, and FIG. 5 is a side view of the tab guide 40. As illustrated in FIGS. 4 and 5, the tab guide 40 is configured by coupling a lower arm 41 to an upper arm 42, and a guide groove is formed between the lower arm 41 and the upper arm 42 so that the electrode tab 4a enters to be slidable.

That is, the lower arm 41 is disposed under the electrode tab 4a, which is either a positive electrode tab protruding from a positive electrode provided in the unit cell 4 or a negative electrode tab protruding from a negative electrode provided in the unit cell 4, and the upper arm 42 is spaced apart from the lower arm 41 in parallel to the lower arm 41 to form a guide groove 43 into which the electrode tab 4a enters while the unit cell 4 is transferred. For reference, although the structure in which the tab guide 40 is disposed only on the second rail 30 is illustrated in FIG. 3, if the positive electrode tab and the negative electrode tab are unit cells protruding in directions opposite to each other, the tab guide 40 may be installed on the first rail 20 as well as the second rail 30. In addition, it is preferable that each of the first rail 20 and the second rail 30 is configured to have the same length as a conveyor 10, which comprises a length connected to the tab guide 40.

In addition, as illustrated in FIG. 4, the upper arm 42 may be formed shorter along the traveling direction than the lower arm 41 and be configured so that the unit cell 4 does not interfere with the upper arm 42 at a point at which a gripper (not shown) grips the unit cell 4 when the unit cell 4 is picked up.

In addition, a height of each of the lower arm 41 and the upper arm 42, which is fixed in a vertical direction, may be adjusted so that a distance and height between the lower arm 41 and the upper arm 42 are adjustable.

In addition, as illustrated more clearly in FIG. 5, the lower arm 41 and the upper arm 42 may be configured to increase in area (increase in size of the guide groove) through which the electrode tab 4a is accessible from an end at which the electrode tab 4a starts to enter. Therefore, even if slight bending occurs in the electrode tab 4a, the electrode tab 4a may easily enter the guide groove 43 along inclined surfaces 41a and 42a.

In the present invention, it is preferable that the rails (the first rail and the second rail) is made of a synthetic resin to minimize generation of frictional force. Particularly, it is preferable that the synthetic resin material is made of an acetal resin, and also, the tab guide 40 is also made of an acetal resin.

In the present invention having the above configuration, protrusions 21 and 31 protrude from the first rail 20 and the second rail 30, respectively, and since the unit cell 4 is in contact with only the protrusions 21 and 31 of the first and second rails 20 and 30 during the traveling, wear and damage due to friction may be maximally suppressed or prevented.

At least two or more protrusions 21 and 31 may be disposed to be spaced apart from each other on each of the first rail and the second rail, thereby distributing the load.

The first rail 20 and the second rail 30 may be configured to move away from or close to the conveyor 10 along a width direction perpendicular to the traveling direction of the unit cell 4, thereby transferring unit cells having various sizes.

Since each of the first rail 20 and the second rail 30 is movable to ascend or descend in the vertical direction, the load of the unit cell, which is applied to the protrusions 21 and 31, may be adjusted.

The second rail 30 may have a length less than that of the first rail 20, and when the unit cell 4 is transferred, a tab guide 40 through which the electrode tab 4*a* passes to prevent sagging of the electrode tab 4*a* from occurring may be disposed to continue along a traveling direction of the unit cell 4, thereby preventing the electrode tab from sagging.

The tab guide 40 may guide the electrode tabs 4*a* having various sizes and shapes because a distance and height between the lower arm 41 and the upper arm 42 are adjusted, and the lower arm 41 and the upper arm 42 may have inclined surfaces 41*a* and 42*a* to increase in size of the guide groove 43 at the end at which the electrode tab 4*a* starts to enter so that the electrode tab 4*a* is guided between the lower arm 31 and the upper arm 42 without an impact.

In addition, in the present invention, each of the rail (the first rail and the second rail) and the tab guide may be made of the acetal resin having the low frictional force to minimize the wear of the unit cell.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

4: Unit cell
4*a*: Electrode tab
10: Conveyor
20: First rail
21, 31: Protrusion
30: Second rail
40: Tab guide

The invention claimed is:

1. A transfer device for a unit cell, configured to transfer a unit cell, in which electrodes and separators are stacked by a predetermined number, the transfer device comprising:
   a conveyor configured to travel in one direction and transfer the seated unit cell when the unit cell is seated;

a first rail disposed at one side of the conveyor in parallel to the conveyor; and
   a second rail disposed at other side of the conveyor in parallel to the conveyor,
   wherein a protrusion protrudes from a surface of each of the first rail and the second rail along the traveling direction of the unit cell, and the unit cell is supported by the protrusions and transferred while being transferred through the conveyor,
   wherein the second rail has a length less than that of the first rail, and
   wherein the transfer device further comprises a tab guide, through which an electrode tab protruding from each of the electrodes passes to prevent sagging of the electrode tab when the unit cell is transferred, disposed to continue along the traveling direction of the unit cell.

2. The transfer device of claim 1, wherein the protrusion protrudes continuously along a longitudinal direction of the first rail and the second rail.

3. The transfer device of claim 2, wherein the protrusion comprises at least two or more protrusions disposed to be spaced apart from and parallel to each other on each of the first rail and the second rail.

4. The transfer device of claim 1, wherein the first rail and the second rail are movable away from or close to the conveyor along a width direction perpendicular to the traveling direction of the unit cell.

5. The transfer device of claim 1, wherein each of the first rail and the second rail is movable to ascend or descend along a vertical direction.

6. The transfer device of claim 1, wherein, the tab guide comprises a lower arm disposed below the electrode tab and an upper arm disposed above the electrode tab disposed in parallel to each other to form a guide groove, into which the electrode tab enters to restrict vertical separation of the electrode tab while the unit cell is transferred, between the upper arm and the lower arm.

7. The transfer device of claim 6, wherein each of the lower arm and the upper arm has an inclined surface so that the guide groove increases in size at an end at which the electrode tab starts to enter.

8. The transfer device of claim 6, wherein a height of each of the lower arm and the upper arm, fixed in a vertical direction, is adjustable so that a distance and height between the lower arm and the upper arm are adjustable.

9. The transfer device of claim 1, wherein the rail is made of a synthetic resin.

10. The transfer device of claim 9, wherein the synthetic resin comprises an acetal resin.

11. The transfer device of claim 1, wherein the tab guide is made of an acetal resin.

\* \* \* \* \*